United States Patent
Lindkamp

(10) Patent No.: US 9,450,328 B2
(45) Date of Patent: Sep. 20, 2016

(54) CABLE FIXING MEANS

(71) Applicant: Harting Electronics GmbH, Espelkamp (DE)

(72) Inventor: Marc Lindkamp, Luebbecke (DE)

(73) Assignee: HARTING ELECTRONICS GMBH, Espelkamp (DE)

(*) Notice: Subject to any disclaimer, the term of this patent is extended or adjusted under 35 U.S.C. 154(b) by 0 days.

(21) Appl. No.: 14/765,941

(22) PCT Filed: Feb. 3, 2014

(86) PCT No.: PCT/DE2014/100026
§ 371 (c)(1),
(2) Date: Aug. 5, 2015

(87) PCT Pub. No.: WO2014/121783
PCT Pub. Date: Aug. 14, 2014

(65) Prior Publication Data
US 2015/0364854 A1 Dec. 17, 2015

(30) Foreign Application Priority Data
Feb. 5, 2013 (DE) .................. 10 2013 101 120

(51) Int. Cl.
*H01B 7/00* (2006.01)
*H01R 13/62* (2006.01)
*H01R 13/42* (2006.01)
*H01R 13/502* (2006.01)
*H01R 13/512* (2006.01)
*H01R 13/52* (2006.01)
*H01R 13/622* (2006.01)
*H02G 15/013* (2006.01)
*H02G 3/22* (2006.01)

(52) U.S. Cl.
CPC .......... *H01R 13/502* (2013.01); *H01R 13/512* (2013.01); *H01R 13/5202* (2013.01); *H01R 13/622* (2013.01); *H02G 3/22* (2013.01); *H02G 15/013* (2013.01)

(58) Field of Classification Search
CPC ............. H01R 13/502; H01R 13/512; H01R 13/5202; H01R 13/622; H02G 5/013; H02G 3/22
USPC ................... 174/135; 439/321, 738
See application file for complete search history.

(56) References Cited

U.S. PATENT DOCUMENTS 4,629,272 A * 12/1986 Mattingly ............ H01R 13/625
439/318
5,432,301 A * 7/1995 Gehring .................. D04C 1/06
174/74 R (Continued)

FOREIGN PATENT DOCUMENTS

| DE | 2631996 | 1/1978 |
|---|---|---|
| DE | 4024285 | 10/1991 |
| DE | 4333628 | 4/1994 |
| DE | 202007003513 | 5/2007 |
| DE | 102010007093 | 8/2011 |
| EP | 2395609 | 12/2011 |
| GB | 2143997 | 2/1985 |
| WO | WO 2009/055681 | 4/2009 |
| WO | WO 2011/042005 | 4/2011 |

*Primary Examiner* — Sherman Ng
(74) *Attorney, Agent, or Firm* — Jacobson Holman, PLLC.

(57) ABSTRACT

The invention relates to a cable retainer (1) for mechanically retaining a cable (10) on a cable outlet, comprising a cable outlet connection piece (2), a sealing element (3) and a pressure element (4), wherein the pressure element (3) can be screwed onto the cable outlet connection piece (2) using a thread (2.1, 3.1) and in this way squeezes the sealing element (3) together between the cable output connector (2) and the pressure element (4). By means of detents (4.2) on the pressure element (4) and detents (2.2) on the cable outlet connection piece (2) that cooperates therewith, a release of the threads (2.1, 3.1) screwed together is prevented.

6 Claims, 3 Drawing Sheets

(56) References Cited

U.S. PATENT DOCUMENTS

| | | | |
|---|---|---|---|
| 5,580,278 A * | 12/1996 | Fowler | H01R 13/65802 |
| | | | 439/321 |
| 5,746,454 A | 5/1998 | Webb | |
| 6,086,400 A | 7/2000 | Fowler | |
| 9,106,012 B2 * | 8/2015 | Gross, III | H01R 13/622 |
| 2009/0067916 A1 | 3/2009 | Busse et al. | |
| 2009/0191752 A1 * | 7/2009 | Montena | H02G 3/0675 |
| | | | 439/584 |
| 2010/0183363 A1 | 7/2010 | Bartholoma et al. | |
| 2010/0323541 A1 * | 12/2010 | Amidon | H01R 13/6397 |
| | | | 439/133 |
| 2012/0292098 A1 | 11/2012 | Kinzl et al. | |

* cited by examiner

CABLE FIXING MEANS

The invention relates to a cable retainer according to the preamble of independent claim 1.

Such cable retainers are needed for fixing a cable to a plug-in connector housing, a housing wall or to other cable outlets. Moreover, depending on the particular version, also a sealing function against environmental influences is desirable.

From the prior art, various versions of such cable retainers are known. The most well-known and wide-spread ones are cable glands, in which a sealing element is squeezed together using a pressure piece that can be screwed on, so that an inserted cable is retained and sealed.

For example, DE2631996C3 shows a screw connection for the feeding in and out of, the sealing of and the providing of strain relief for cables or leads, in which a pressure screw clamps together clamping tabs having an inserted seal and thus compresses and seals an inserted cable.

WO2011042005A2 shows a plug-in connector, the cable outlet of which is cast in plastic. By virtue of the plastic jacket, the plug-in connector is irreversibly locked in and sealed. However, such a process for casting is technically complex, hard to control and therefore expensive.

What is of disadvantage in connection with the first-mentioned solutions known from the prior art is that the cable retainers are mostly screwed using a thread. This thread connection can be opened and closed multiple times. This does not provide any security from manipulation of the cable retainer.

The second solution known from the prior art, in which the cable outlet is embedded so as to retain it, is no alternative to a screw connection because the injection moulding process is hard to control and does often not lead to clean and functional results, Moreover, casting is very time consuming and requires very expensive injection moulding devices.

It is therefore the object of the invention to form a cable retainer in such a way that it is designed in a tamper-proof manner or at least indicates any manipulation.

This object is achieved by means of the characterising features of the subject matter of independent claim 1.

Advantageous embodiments of the invention are indicated in the dependent claims.

The invention relates to a cable gland as is generally known from the prior art. By screwing a pressure element onto a cable outlet connection piece, a sealing element located between the pressure element and the cable outlet connection piece is squeezed together. In the axial direction, the pressure element, the cable outlet connection piece and the sealing element have an opening for feeding through a cable to be retained.

As a result of squeezing the sealing element together, a cable fed through the cable retainer is radially clamped and sealed. According to the invention, these parts are irreversibly latched together when the pressure element is screwed onto the cable outlet connection piece, Once the pressure element has been screwed on, it can no longer be released from the cable outlet connection piece.

The latching together of the pressure element and the cable outlet connection piece is substantially carried out by means of latching elements. The latching elements are moulded onto the pressure element and the cable outlet connection piece in such a way that they can be screwed on but cannot be screwed off any more.

The individual latching teeth of the latching elements may be selectively orientated axially or radially to the longitudinal axis of the cable retainer.

In a particular embodiment, the latching elements of the cable outlet connection piece are not directly moulded to the latter, but to a latch ring. The latch ring is expediently not rotatable, but can be reversibly attached to the cable outlet connection piece.

When screwing the pressure element onto the cable outlet connection piece, the latching elements of the cable outlet connection piece latch together with the latching elements of the latch ring. Since the latch ring sits on the cable outlet connection piece in a non-rotatable manner, the pressure element cannot be screwed off.

In a particular embodiment, the latch ring has a predetermined breaking point. In case the pressure element is screwed back against the latch, the latch ring can break on this predetermined breaking point and can allow the pressure element to be screwed off.

In this way, the latch ring allows a sealing function to be realised. Thus, any manipulation or unauthorised opening of the cable retainer can immediately be detected by the user.

By replacing the destroyed latch ring with a new one, the cable retainer can be re-closed and "re-sealed". It is not necessary to replace any other components of the cable retainer.

EMBODIMENT EXAMPLE

One embodiment example of the invention is shown in the drawings and will be explained in more detail below, wherein.

Figure 1:
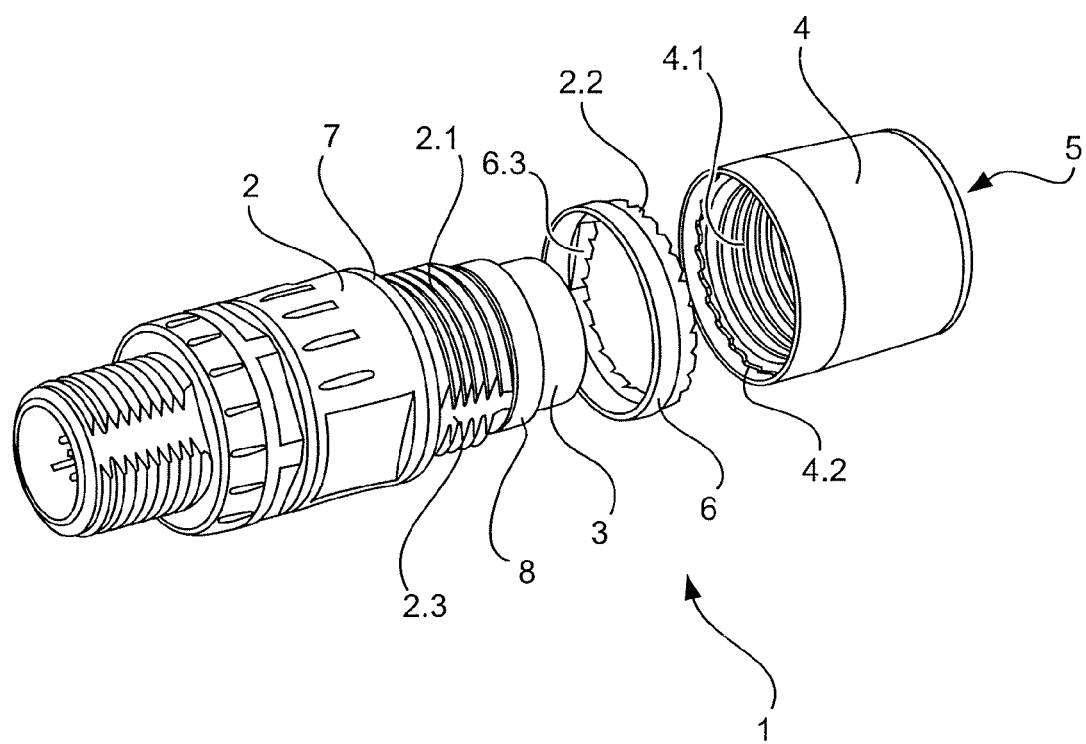
FIG. 1 shows a perspective view of a plug-in connector with a non-assembled cable retainer.

FIG. 1 shows a circular plug-in connector with a cable retainer 1 according to the invention. In the left-hand region of the figure, the plug-in side of the circular plug-in connector is shown. The elements of the circular plug-in connector are not addressed in any more detail herein. In the right-hand region of the figure, the elements of the cable retainer 1 as shown in the exploded view are disposed on the circular plug-in connector.

The cable retainer 1 is substantially made up from a cable outlet connection piece 2, which is here moulded onto the circular plug-in connector, a sealing element 3 as well as a pressure element 4.

Both the cable outlet connection piece 2 and the pressure element 4 are each provided with a thread 2.1 and 4.1, respectively, which can be screwed together. By screwing the pressure element 4 onto the cable outlet connection piece 2, the sealing element 3, which is inserted into the cable outlet connection piece 2, is squeezed together.

The cable retainer 1 forms a through-opening 5 that is suitable for inserting the cable. In this way, an inserted cable can be mechanically fixed by means of the sealing element 3 squeezed together and can be sealed against external influences.

According to the invention, the pressure element 4 has detents 4.2, which in this embodiment are located on the inner side of the pressure element 4. These engage in detents 2.2 that are attached to the cable outlet connection piece 2 in a non-rotatable manner, so that a screwing off of the pressure element 4 is prevented.

In this particular embodiment shown, the detents 2.2 are not directly moulded onto the cable outlet connection piece 2, but are provided on a latch ring 6. The latch ring 6 can be attached to the cable outlet connection piece 2. Mouldings 6.3 on the inside of the latch ring 6 engage in recesses 2.3 of the cable outlet connection piece 2. As a result, the latch ring 6 can be placed on the cable outlet connection piece 2 in a non-rotatable manner.

Moreover, a spring element 7 is provided between the cable outlet connection piece 2 and the latch ring 6. The spring element 7, which acts in the latching direction of the detents 2.2 and 4.2, ensures a clean engagement of the detents 2.2 and 4.2 inside of each other. As a result of the here axial force acting on the latch ring 6 against the pressure element 4 it is ensured that the detents securely engage with each other and the pressure element 4 can no longer be screwed off.

Figure 2:
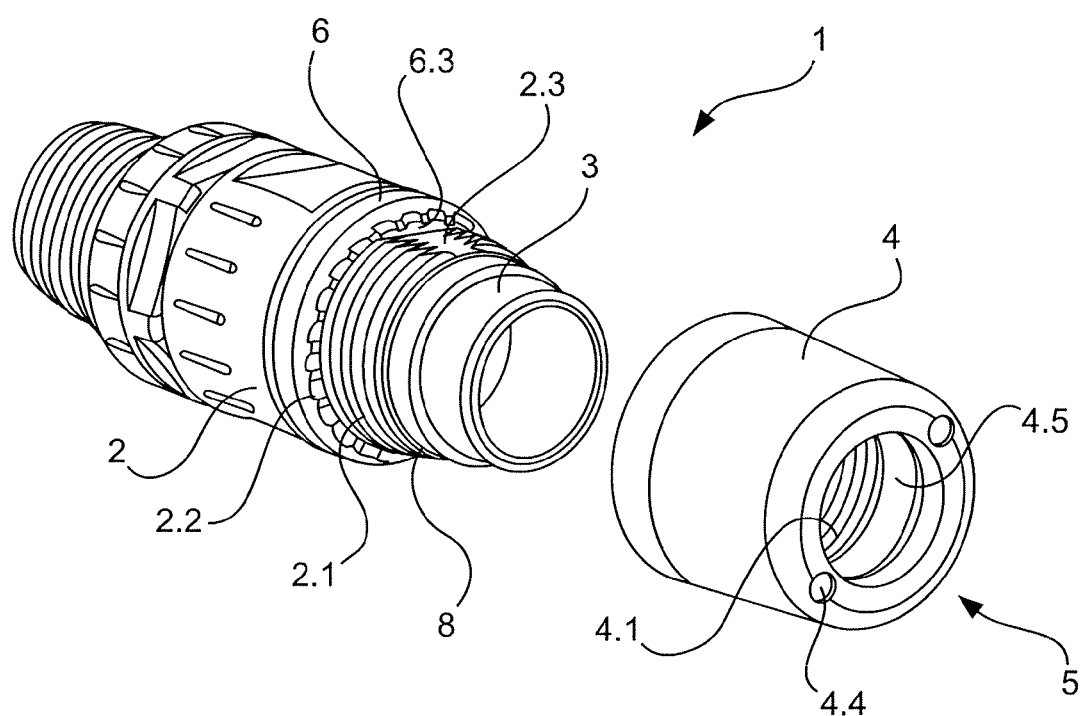
FIG. 2 shows the cable retainer from FIG. 1 in a further perspective view.

FIG. 2 shows the cable retainer from FIG. 1 in a further perspective view. The latch ring 6 has here already been placed on the cable outlet connection piece 2. It can be seen how the moulding 6.3 engages in the recess 2.3. As a result, the latch ring 6 cannot be rotated on the cable outlet connection piece 2.

In this embodiment, the recesses 2.3—one is visible, the one on the opposite side is not visible—is inserted into the thread 2.1 of the cable outlet connection piece 2.

In the embodiment shown, a sliding ring 8 is additionally shown, which prevents a rotation of the sealing element 3 during the screwing on of the pressure element 4. Such sliding rings 8 are already multiply known from the prior art.

The pressure element 4 shown in this embodiment advantageously has two keyholes 4.4 used for actuating the pressure element 4. Since the pressure element 4 does not have a moulding here for using a fork wrench or a knurling for manual actuation, it can be actuated by means of a suitable key. Thus, the possibility of any manipulation or opening of the cable retainer 1 by a user can be eliminated.

Moreover, FIG. 2 shows a tapering 4.5 inside the pressure element 4. This tapering 4.5 of the inside diameter ensures, as is also multiply known from the prior art, the squeezing together of the sealing element 3, which effects a fixing and sealing of an inserted cable.

Figure 3:
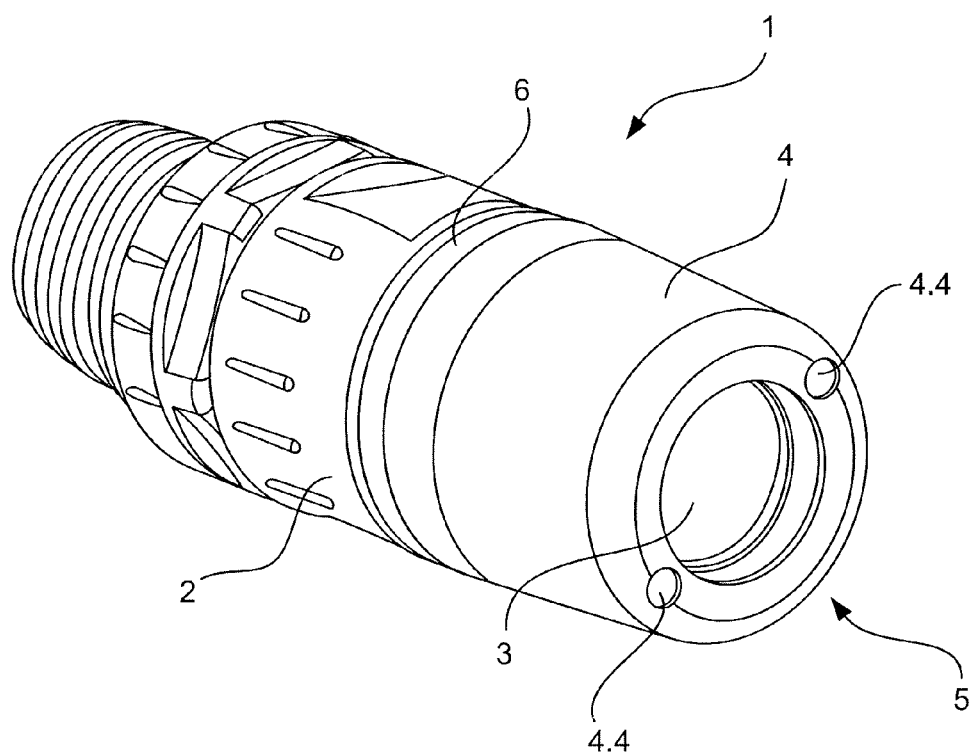
FIG. 3 shows the fully assembled and screwed cable retainer.

FIG. 3 shows a fully assembled and screwed cable retainer 1 as already shown in FIGS. 1 and 2. The detents 4.2 of the fully screwed-on pressure element 4 engage in the detents 2.2 of the latch ring 6. The cable retainer 1 can be opened only by screwing the pressure element 4 off using an appropriate key for the keyholes 4.4, and such opening would result in the destruction of the latch ring 6.

Advantageously, a predetermined breaking point in the latch ring 6 may be provided for this purpose. Thus, it can be ensured that when the cable retainer 1 is opened, only the latter fails and is destroyed. The latch ring 6, which is in this way used as a sealing ring, can be replaced simply and at low costs, in order to allow the cable retainer 1 to be re-sealed. Cable Retainer List of Reference Numerals 1. Cable retainer
2. Cable outlet connection piece
2.1 Thread
2.2 Detents
2.3 Flattening
3. Sealing element
4. Pressure element
4.1 Thread
4.2 Detents
4.4 Keyholes
4.5 Tapering
5. Through-Opening
6. Latch ring
6.3 Moulding
7. Spring element
8. Sliding ring

The invention claimed is:

1. A cable retainer (1) for mechanically fixing a cable to a cable outlet,
comprising a cable outlet connection piece (2), a sealing element (3) and a pressure element (4),
wherein the cable outlet connection piece (2) has a first thread (2.1), the pressure element (3) has a second thread (3.1) and the two threads (2.1, 3.1) cooperate in such a way that the pressure element (4) can be screwed onto the cable outlet connection piece (2),
wherein the sealing element (3) is provided between the cable outlet connection piece (2) and the pressure element (4), and wherein the components (2, 3, 4) of the cable retainer (1) have a through-opening (5) used for receiving a cable to be retained,
wherein the pressure element (4) has detents (4.2) and the cable outlet connection piece (2) has detents (2.2),
wherein the detents (2.2, 4.2) engage with each other in such a way that a release of the threads (2.1, 3.1) screwed together is prevented,
wherein the detents (2.2, 4.2) are each formed by peripheral latching teeth, wherein the detents (2.2) are formed counter-currently to the detents (4.2),
wherein the detents (2.2) are moulded onto an additional latching element (6) that can be placed on the cable outlet connection piece (2) in a non-rotatable manner,
characterised in that
the latching element (6) has at least one predetermined breaking point and in that, by screwing off the pressure elements (4) against the detents (2.2, 4.2), the latching element (6) can be broken at the predetermined breaking point.

2. The cable retainer according to claim 1,
characterised in that
the latching element (6) is formed as a ring and is retained in a non-rotatable manner on at least one flattening (2.3) on the cable outlet, connection piece (2) by means of at least one corresponding moulding (6.3) on the latching element (6).

3. The cable retainer according to claim 1,
characterised in that
a spring element (7) is provided which applies a spring force on the latching element (6) against the detents (2.2, 4.2).

4. The cable retainer according to claim 3,
characterised in that
the spring element (7) is an elastically deformable plastic ring.

5. The cable retainer according to claim 1,
characterised in that
the detents (2.2, 4.2) are formed in an axial direction of the threads (2.1, 4.1).

6. The cable retainer according to claim 1,
characterised in that
the detents (2.2, 4.2) are formed in a radial direction relative to the threads (2.1, 4.1).

* * * * *